Sept. 30, 1941. A. DE BOGORY 2,257,524
SOLAR WATER HEATER
Filed March 15, 1938
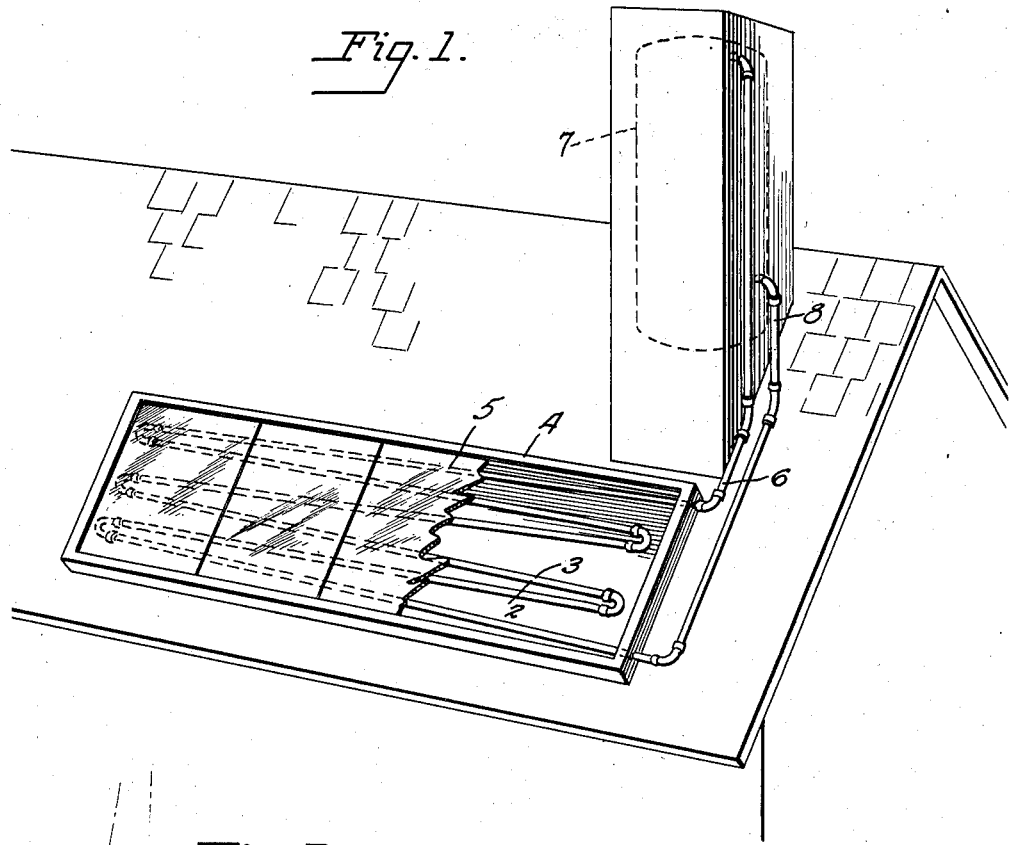
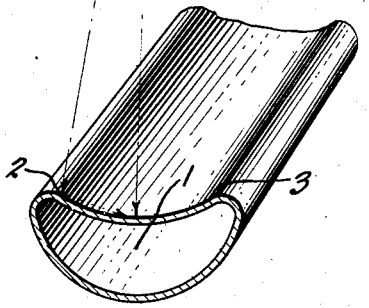
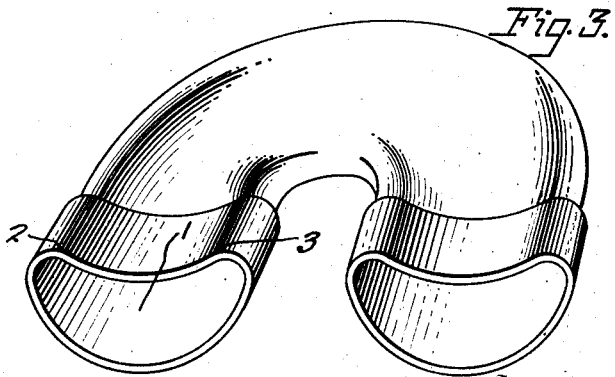
Inventor
Alexander DeBogory
By Mason Fenwick & Lawrence
Attorneys Patented Sept. 30, 1941

2,257,524

UNITED STATES PATENT OFFICE 2,257,524

SOLAR WATER HEATER

Alexander De Bogory, Miami, Fla.

Application March 15, 1938, Serial No. 195,971

2 Claims. (Cl. 126—271)

My invention relates to a solar water heater used to heat water for household use or any other purpose where hot running water is used.

The object of my invention is to provide a solar water heater with an improved type of tube or pipe which carries the water and also transmits the heat of the sun to the water which by gravity flows into a reservoir or tank to be stored for use.

The conventional tubes heretofore used in this type process are of a round construction, with heavy non-heat-conducting return bends of the same round shape, which round construction does not allow a maximum absorption of sun heat rays in relation to the surface exposed on account of the convex surface of the round tube being exposed to the heat rays of the sun, thereby diffusing the heat rays. An example of this is the earth with its north and south poles covered with perpetual snow and ice, and in turn the perpetual heat at the equator.

In the drawing,

Figure 1 is a partial perspective view of the apparatus showing a preferred embodiment of this invention.

Figure 2 shows a cross-section view of a tube incorporating features of this inventive concept.

Figure 3 shows a return bend tube having features of this invention.

To overcome the foregoing fault, as will be seen with reference to the drawing, Fig. 1 shows a cut-away section of a solar heater, with the heater coils in place, Fig. 2 shows a cross section of my new design improved tube, this tube as shown has a concave surface exposed to heat rays of the sun and allows a more concentrated amount of heat to be transmitted to the water than can be done with a round tube of the same peripheral circumference. This improved design tube also allows a concentration of heat at the most needed place—that is, Fig. 2, No. 1, the lowest section of the tube where the water is the coldest, the hot portion of the water being driven by gravity to the uppermost section of the tube as indicated by 2 and 3, Fig. 2. This action causes a faster, more thorough and uniform, heating of the water in the tube thereby creating a faster gravity movement in the tube longitudinally and consequently heating a greater amount of water than can be attained by the conventional type tube.

It is evident that the concave design of the tube allows of a more direct concentration of heat at its central or lowest point, Fig. 2, No. 1. The radiation of sun rays from the upper sides of the concave surface Fig. 2 at 2 and 3, causes the heat from upper sides of the concave surface of the tube to radiate or reflect towards the center of the arc of concave surface, thereby mingling with and superheating the direct vertical rays of the sun which fall on and vertically with the lowest portion and most essential part of the tube to be heated.

It will also be readily seen the cross section of the pipe or tube in my improved solar water heater, Fig. 2, allows a more even distribution of heat to the water by reason of a more uniform depth of water exposed to the heating surface.

In Figure 1 is illustrated an application of the invention in which the improved tubes are arranged in an open boxlike structure 4 having a glass top to prevent air circulation all positioned on a roof and associated with a tank 7, the top of which communicates with the upper reach of the heater by pipe 6 while a pipe 8 completes the circulation of water between the bottom of the tank and the lowest reach of the heater tube. Fig. 3 of the drawing illustrates the return bend, which is of the same design as the concave-convex tube, thereby allowing a continuous maximum absorption of heat throughout the entire length of the tube, and causing no interruption of heat penetration or flow of water through this return bend which is an advantage over the cast return bend of the conventional sun water heater.

This construction also overcomes the danger of the tube bursting in case of freezing, as the concave-convex surface of the tube or pipe can easily adjust itself to this expansion.

Having thus fully described my improvements in solar water heater pipes or tubes, I claim:

1. A solar water heater provided with a continuous longitudinal concave top and continuous convex bottom tube, the concave top of said tube being exposed to the heat rays of the sun, the concavity of said top being relatively shallow and of such curvature that the lower portion of the exposed upper concave surface will receive the heat rays reflected from the sides thereof.

2. In a solar heater a continuous serpentine tube arranged in a common plane, the exterior of said tube being of uniform concavo-convex form in cross-section, said tube arranged with the concave surface uppermost and directed to receive solar radiation, the curve of said upper concave surface being such that the concavity is shallow and its side walls reflect part of the incident radiation onto the bottom thereof.

ALEXANDER DE BOGORY.